F. R. COOK.
CUSPIDOR.
APPLICATION FILED DEC. 29, 1919.
1,362,474.
Patented Dec. 14, 1920.
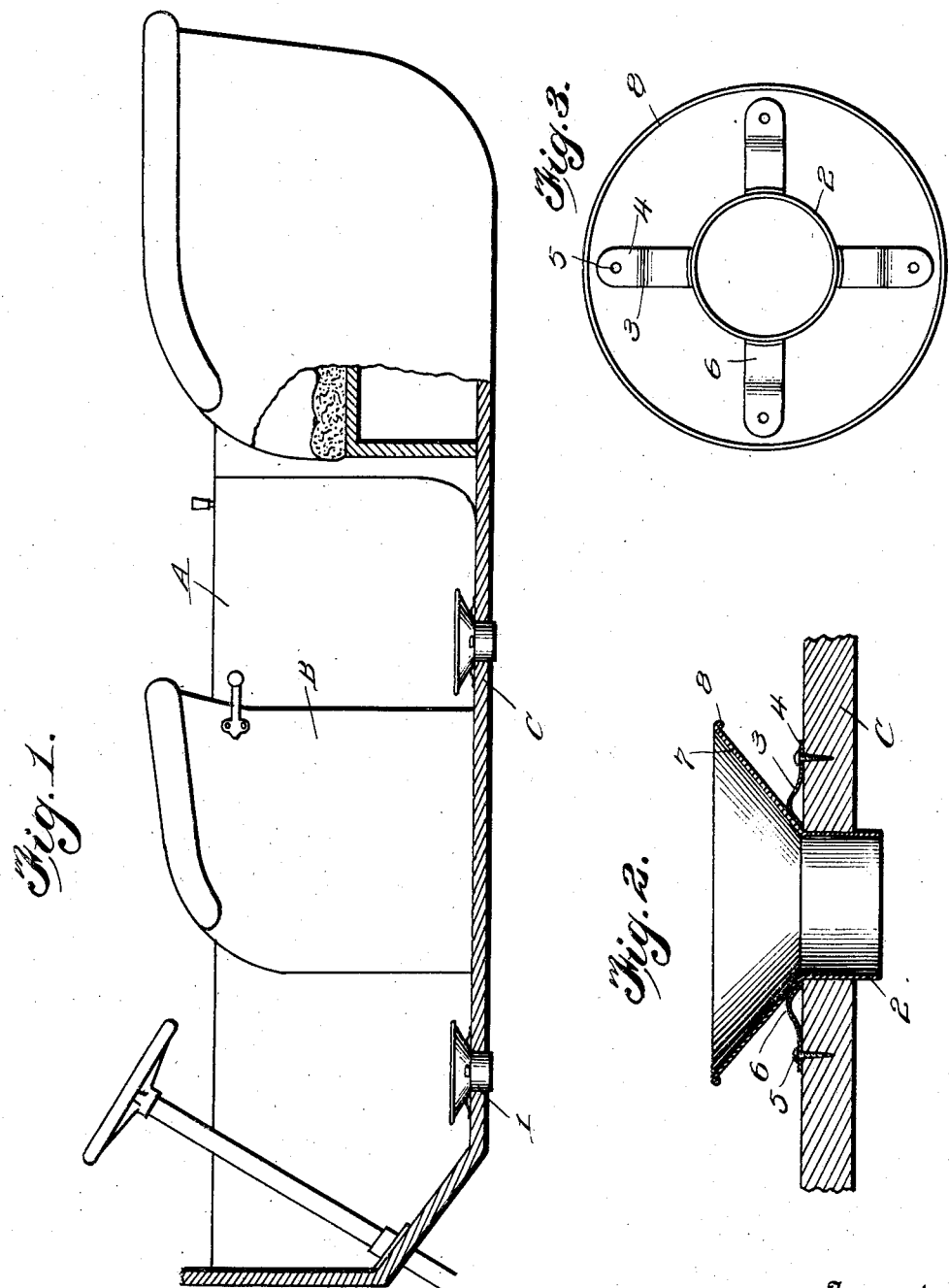
Inventor
F. R. Cook
By Geo. P. Kimmel
Attorney

UNITED STATES PATENT OFFICE.

FRANK R. COOK, OF BAXTER SPRINGS, KANSAS.

CUSPIDOR.

1,362,474.      Specification of Letters Patent.      Patented Dec. 14, 1920.

Application filed December 29, 1919. Serial No. 348,172.

*To all whom it may concern:*

Be it known that I, FRANK R. COOK, a citizen of the United States, residing at Baxter Springs, in the county of Cherokee and State of Kansas, have invented certain new and useful Improvements in Cuspidors, of which the following is a specification.

This invention relates to cuspidors, and has particular reference to improvements in cuspidors adapted for use in automobiles or other vehicles.

The principal objects of the invention are; to provide a cuspidor of the type indicated which is so constructed as to permit saliva, cigars, or cigarettes to pass immediately to the ground in order to keep the body of the cuspidor sanitary and clean; and to provide means for supporting cuspidors so that the same will not rattle or become displaced during operation of the vehicle.

With these objects and others in view which will appear as the nature of the invention is better understood, the invention comprises the various novel features of construction and arrangement of parts, which will be more fully described hereinafter and set forth with particularity in the claims appended hereto.

In the drawings wherein is illustrated the preferred embodiment of the invention;

Figure 1 indicates a portion of a vehicle body having the cuspidor which is the subject matter of the present invention carried therein.

Fig. 2 is a detail sectional side view of the cuspidor showing the same mounted in the floor of a vehicle, and Fig. 3 is a bottom plan view of the cuspidor detached.

Similar characters of reference indicate like or similar parts throughout the several views of the drawings, in which A designates generally an automobile of conventional type provided with seats B and flooring C, all of which are merely shown to illustrate the application of the invention.

In the present instance, the flooring B of the automobile is provided with a plurality of openings 1 adjacent the seats B within which are mounted funnel-like cuspidors, the open cylindrical depending neck 2 of which extends through said openings and discharges onto the ground beneath the vehicle.

Arranged radially relatively to the openings and preferably disposed diametrically opposite each other are a plurality of springs 3 the other ends of which constitute shanks 4, secured as at 5 to the flooring C with their free ends bent upwardly and downwardly as shown at 6 upon which the outwardly flared tops 7 of the cuspidors are seated, said springs operating to hold the cuspidors in operative position and to prevent rattling during motion of the vehicle. The flared tops are beaded as at 8 and the depending portions 2 extend considerably below the under surface of the flooring.

From the foregoing it will be seen that the usual contents of the cuspidors pass immediately to the ground, thus keeping the same sanitary and clean. However, when it is desired to clean the same they are merely lifted out of the openings 1 and when the operation is completed replaced again.

As many changes could be made in the above construction and many apparently widely different embodiments of this invention could be made without departing from the scope thereof, it is intended that all matters contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

What I claim is

1. The combination with a vehicle having a floor with an opening therein, of a cuspidor seated in said opening and having a cylindrical open neck extending through the opening, a flared mouth carried by said neck, and upwardly and downwardly bent supporting plate springs engaging the flared mouth and secured to the floor in diametrically opposed relation.

2. The combination with a vehicle having a floor with an opening therein; of a cuspidor having a cylindrical neck extending through said opening, and plate springs radially arranged relatively to said opening and secured at their outer ends to said floor, the inner ends of said springs being bent upwardly and then downwardly with their terminals located in close proximity to the opening and engaging the cuspidor to operate as securing means and as anti-rattlers for the cuspidor.

In testimony whereof, I affix my signature hereto.

FRANK R. COOK,